United States Patent [19]

Metzelfeld et al.

[11] Patent Number: 4,878,346
[45] Date of Patent: Nov. 7, 1989

[54] TAB-ALIGNED REPLACEABLE CARTRIDGE FOR MASTER CYLINDER

[75] Inventors: Glenn S. Metzelfeld, Brookfield; James A. V. Buckely, Whitefish Bay; Donald D. Brown, Thiensville, all of Wis.

[73] Assignee: Hayes Industrial Brake, Inc., Mequon, Wis.

[21] Appl. No.: 77,615

[22] Filed: Jul. 24, 1987

[51] Int. Cl.[4] .................. B60T 11/16; F16J 10/04
[52] U.S. Cl. ........................... 60/588; 92/128; 92/161; 92/169.1; 92/171
[58] Field of Search .............. 60/584, 588, 533, 562; 92/128, 59, 169.1, 171, 161, 146

[56] References Cited

U.S. PATENT DOCUMENTS

| | | | |
|---|---|---|---|
| 1,768,799 | 7/1930 | Stanley | 92/59 |
| 2,093,543 | 9/1937 | Bowen | 92/59 |
| 2,156,205 | 4/1939 | Swift | 60/588 |
| 2,335,069 | 11/1943 | Loweke | 60/578 |
| 2,531,705 | 11/1950 | Schultz | 92/59 |
| 2,759,329 | 8/1956 | Ponti | 60/588 |
| 3,157,034 | 11/1964 | Beavers | 92/169.1 X |
| 3,260,169 | 7/1966 | Salton | 92/59 |
| 3,395,620 | 8/1968 | Schmoeger | 92/161 X |
| 4,103,492 | 8/1978 | Sakazume | 60/588 |
| 4,162,616 | 7/1979 | Hayashida | 92/171 X |
| 4,258,549 | 3/1981 | Nakashima | 60/588 |
| 4,312,264 | 1/1982 | Nunnemacher et al. | 92/161 |
| 4,599,860 | 7/1986 | Parsons | 60/584 |
| 4,611,529 | 9/1986 | Stricker | 92/128 |
| 4,685,299 | 8/1987 | Myers | 92/128 |
| 4,703,624 | 11/1987 | Lilley et al. | 60/588 |
| 4,785,721 | 11/1988 | Leighmonstevens et al. | 60/588 X |
| 4,798,128 | 1/1989 | Mita | 92/171 X |

FOREIGN PATENT DOCUMENTS 8999  1/1980  Japan .................... 92/171

*Primary Examiner*—Robert E. Garrett
*Assistant Examiner*—George Kapsalas
*Attorney, Agent, or Firm*—Foley & Lardner

[57] ABSTRACT

A replaceable cartridge assembly for master cylinder having a housing with a longitudinal bore and an oil inlet connected to the longitudinal bore. The assembly includes a cylinder removably mounted in the longitudinal bore, a pair of seal rings mounted on the cylinder and located on each side of the oil inlet, an axial bore in the cylinder having a fluid outlet at one end connected to the brake system, and a pair of ports connecting the space between the seal rings to the axial bore in the cylinder. A piston in the cylinder has a cup seal around the outside and an O-ring seal spaced from the cup seal. A collar in the end of the axial bore in the cylinder retains the piston in the bore while a spring in the axial bore in the cylinder biases the piston away from the end of the cylinder.

8 Claims, 3 Drawing Sheets

TAB-ALIGNED REPLACEABLE CARTRIDGE FOR MASTER CYLINDER

BACKGROUND OF THE INVENTION

Master cylinders of the type contemplated herein are provided with either a remote type reservoir wherein the oil supply is located at a remote location from the master cylinder or an integral type wherein the reservoir for the hydraulic fluid is a part of the master cylinder housing. Each of these styles has been individually designed for use in a particular environment. In both types the master cylinder generally included a housing or body having a longitudinal bore containing a piston assembly which is used to produce an increase in the hydraulic pressure in the bore in order to pressurize the brake lines for the brake assembly of a vehicle. The piston assembly is mounted in the bore of the master cylinder housing, and includes a number of seals which are continuously reciprocated in the bore in the housing. This continuous intermittent motion of the piston produces wear of the seals. If the seals fail or any other part of the master cylinder fails, the master cylinder has to be either rebuilt and/or replaced.

Each type of master cylinder formerly used a different type of piston assembly which increased the number of repair parts in inventory as well as down time when the master cylinder had to be replaced.

SUMMARY OF THE INVENTION

A principal feature of the present invention is the provision of a replaceable cartridge assembly which is interchangeable with any of the three types of master cylinder bodies. The cartridge assembly includes a piston and cylinder which are assembled at the point of manufacture thus eliminating any contamination. The assembly can be quality inspected for leakage and proper functioning at the manufacturing point prior to shipment.

A further feature of the invention is the use of bar stock for the cylinder which can be simply and easily machined to fit the bore provided in each of the master cylinder housings. The overall cost can be reduced considerably by using machined parts. The use of a wrought bar adds the further advantage of having no porosity in the cylinder. Machined castings are inherently porous.

A further feature of the invention is the reduction in down time of the piece of equipment due to the convenience of installation of the assembly. The cartridge assembly can be repaired when convenient.

Other principal features and advantages of the invention will become apparent to those skilled in the art upon review of the following detailed description, claims and drawings.

DETAILED DESCRIPTION OF THE DRAWINGS

Figure 1:
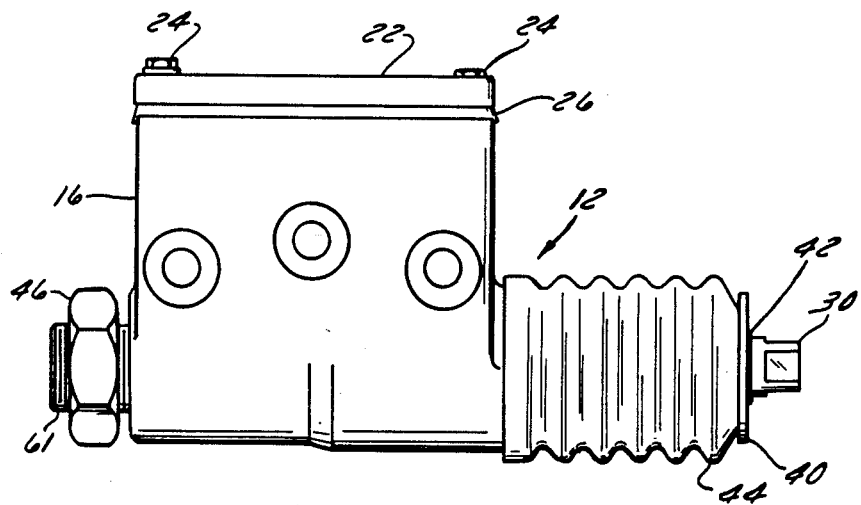
FIG. 1 is a side elevation view of an integral reservoir type master cylinder.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose and description and should not be regarded as limiting.

DETAILED DESCRIPTION OF THE PREFERRED EMBODIMENTS

Figure 2:
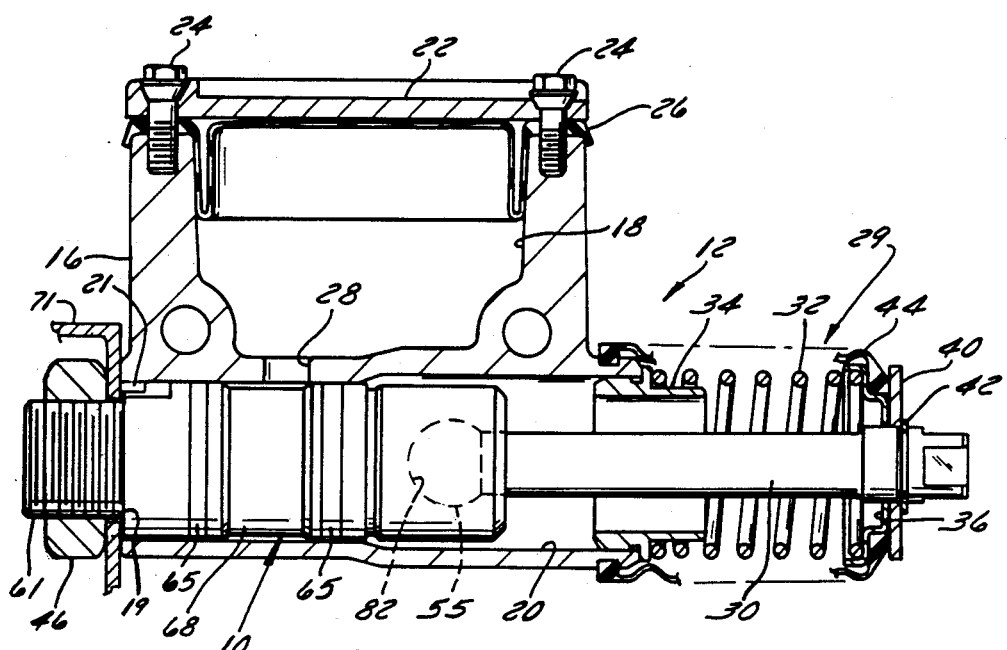
FIG. 2 is a section view of FIG. 1 showing the cartridge assembly in the master cylinder.
Figure 3:
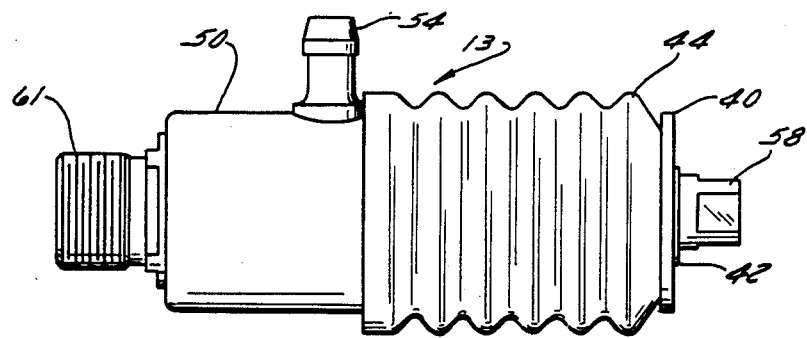
FIG. 3 is a side elevation view of a remote reservoir type master cylinder.
Figure 5:
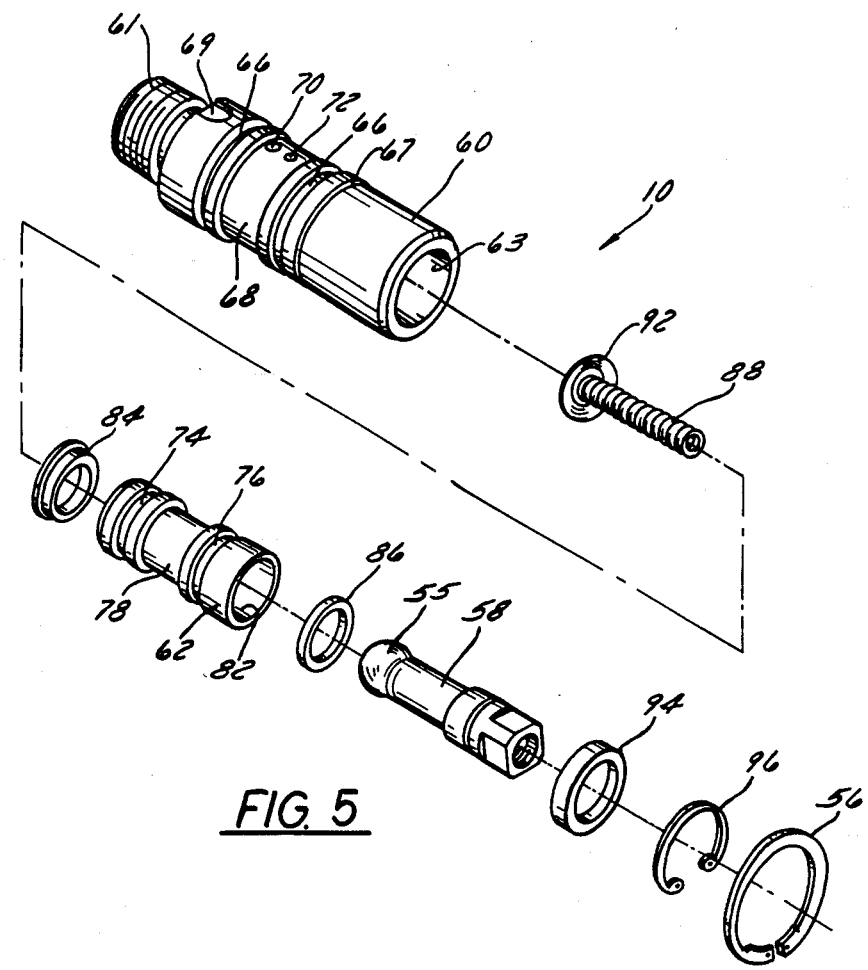
FIG. 5 is an exploded perspective view of the interchangeable cartridge assembly according to the present invention.
Figure 4:
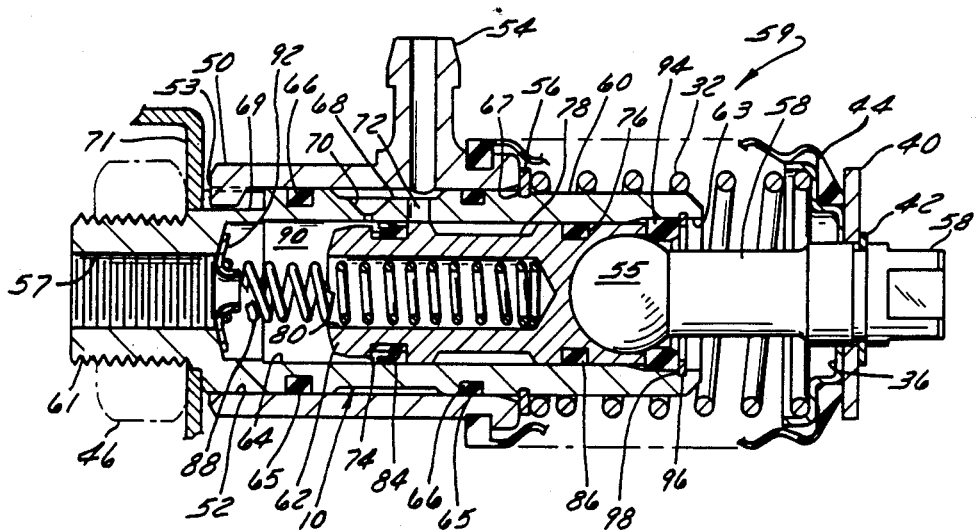
FIG. 4 is a section view of the remote type master cylinder.

The cartridge assembly 10, according to the present invention, is shown positioned in either an integral reservoir type master cylinder 12 in FIGS. 1 and 2 or a remote reservoir type master cylinder 13 in FIGS. 3 and 4.

In this regard, the reservoir type master cylinder 12 includes a housing 16 having a reservoir or chamber 18, a longitudinal bore 20 and a counter bore 20a. The chamber 18 is closed by a cover 22 secured to the housing by bolts 24. A cover seal 26 is generally provided in the chamber 18. The chamber 18 is connected to the longitudinal bore 20 by means of an oil inlet 28. The cartridge assembly 10 is positioned in the longitudinal bore 20 with the threaded end 61 of cylinder 60 extending outwardly through the outlet opening 19 in the fixed mounting stop 71. The cartridge assembly 10 is secured to the fixed mounting stop by means of a nut 46 mounted on the threaded end 61. Locating means in the form of a tab 21 is provided for aligning the cartridge assembly 10 in the longitudinal bore 20. As seen in FIG. 2, the cartridge assembly 10 is positioned in the longitudinal bore 20 and is actuated by means of a push rod assembly 29 mounted on the housing 16.

In this regard, the assembly 29 includes a push rod 30 seated in one end of the cartridge assembly 10. The rod 30 is supported at the other end by a return spring 32 seated on a spring mounting 34 seated on the open end of the bore 20. The spring 32 bears against a spring retainer plate 36 provided on the other end of push rod 30 and retained thereon by means of a washer 40 and a snap ring 42. It should be noted that the housing 16 is biased into engagement with the fixed stop 71 by means of the spring 32. The return spring 32 is enclosed within a dust boot 44 having one end mounted on the housing 16 and the other end mounted on the spring retainer 36.

In the remote type master cylinder 13, the master cylinder housing 50 includes a longitudinal bore 52 and an oil inlet 54 which is connected to a remotely located reservoir. The longitudinal bore 52 and the longitudinal bore 20 in cylinder 12 have the same diameter. A locating means in the form of a tab 53 is located in the bore 52. The cartridge assembly 10 is located in the bore 52 and is retained therein by means of a retaining ring 56 mounted in an annular groove 67 provided in cartridge assembly. The cartridge assembly 10 is mounted on a fixed mounting stop 71 by means of a nut 46 mounted on the threaded section 61. The cartridge assembly 10 is actuated by means of a push rod assembly 59.

In this regard, the assembly 59 includes a push rod 58 which is seated in one end of the cartridge assembly and biased by means of the spring 32 to an inoperative position. Spring 32 is seated between the retaining ring 56 and a spring retainer plate 36 which is secured to the push rod 58 by a washer 40 and the snap ring 42. It should be noted that the housing 50 is biased into engagement with the fixed mounting stop by means of the spring 32. A dust boot 44 is used to enclose the spring 32 and is connected to the housing 50 on one end and to the spring retainer plate 36 at the other end.

In accordance with the invention, the cartridge assembly 10 includes a cylinder 60 and a piston 62. The cylinder 60 is adapted to be mounted in the longitudinal bore 20 or 52 of either of the master cylinders housings 16 or 50. In this regard, the cylinder 60 includes an axial bore 64 having a counter bore 63 at the open end and threaded section 61 having a threaded opening 57 at the head end. The cylinder 60 is sealed in the longitudinal bore by means of a pair of O-ring seals 65 mounted in a pair of annular O-ring grooves 66 provided around the outside of the cylinder 60. Means in the form of an annular recess 68 is provided between the grooves 66 to form an oil reservoir around the outside of the cylinder. The recess or reservoir 68 is connected to the axial bore 64 by means of a timing port 70 and a compensating port 72.

Means are provided in the forward end of the cylinder 60 for positively locating the cylinder 60 in the bore 20, 52 of the master cylinders. Such means is in the form of a slot 69 which must be aligned with the locating tab 21, 53 in the bore 20, 52 of the master cylinder housings 16 or 50.

The piston 62 is mounted in the axial bore 64 of the cylinder 60, with the head end spaced from the end of the threaded opening 57 to form a pressure chamber 90 in the axial bore 64. The piston 62 is sealed in the bore by means of a cup seal 84 mounted in an annular groove 74 and an O-ring seal 86 mounted in an annular O-ring groove 76. Means in the form of an annular recess 78 is provided between the grooves 74 and 76 to form an annular reservoir around the piston. A blind bore 80 is provided at the head end of the piston 62 and a spherical recess 82 is provided at the other end of the piston 62. Means are provided in the chamber 90 for biasing the piston 62 toward the open end of the bore 64. Such means is in the form of a return spring 88 which is positioned in the bore 80 and seated on a spring plate 92 at the end of the threaded passage 57.

The piston 62 is retained in the cylinder by means of a snap ring 96 positioned in a groove 98 in the counter bore 63.

The piston 62 is moved forward in the bore 64 by means of a push rod 58 which includes a spherical ball 55, that is seated in the spherical opening 82 at the end of the piston 60. The piston 60 is pushed inward to increase the pressure in the chamber 90 which is connected to the brake line through threaded opening 57.

Various other features and advantages of the invention are set forth in the following claims.

We claim:

1. A master cylinder comprising a housing having a longitudinal bore,
an oil inlet connected to said bore,
an outlet opening at one end of said bore, and, a tab in said bore,
an independent cartridge assembly removably mounted in said longitudinal bore and including a cylinder having a slot in a position to engage said tab to align said cylinder in said longitudinal bore, an axial bore, an oil outlet passage at one end of said axial bore, means on said one end of said cylinder for mounting said cylinder on a fixed stop, annular seal means around the outside of said cylinder to form a seal with said longitudinal bore on each side of said oil inlet,
a pair of ports in said cylinder located between said annular seal means connecting said longitudinal bore to said axial bore in said cylinder,
a piston positioned in said axial bore in a spaced relation to said oil outlet passage to define a pressure chamber in said axial bore,
seal means on the outside of said piston positioned to form a seal on each side of one of said ports to form a compensating reservoir around said piston, one of said seals closing the other of said ports on operation of said piston, and means mounted on said housing for actuating said piston to discharge fluid in said axial bore through said outlet passage, said actuating means including means for biasing said housing into engagement with said fixed stop, the assembly being so constructed and arranged that said cylinder, annular seal means, piston and piston seal means can be removed from the housing as an assembled unit.

2. A master cylinder comprising a housing having a longitudinal bore, a tab in said longitudinal bore, and a fluid inlet for connecting a source of fluid to said longitudinal bore,
and an independent cartridge assembly removably positioned in said bore, said assembly including a cylinder having an axial bore, port means for connecting said longitudinal bore to said axial bore, a fluid outlet passage at one end of said cylinder which is adapted to be connected to a brake assembly, a slot in said one end of said cylinder for engaging said tab to align said cylinder in said bore, and means at said one end of said cylinder for mounting said cylinder on a fixed member,
a piston mounted for reciprocal motion in said axial bore in said cylinder, means within said cylinder for biasing said piston away from said fluid outlet passage,
and means mounted on said housing for actuating said piston to discharge fluid in said axial bore through said fluid outlet passage to selectively pressurize the brake assembly.

3. The master cylinder according to claim 2 wherein said cylinder includes seal means positioned to engage said longitudinal bore on each side of said fluid inlet to form an annular fluid flow passage around said cylinder between said fluid inlet and said port means in said cylinder.

4. The master cylinder according to claim 3 wherein said piston includes seal means positioned to engage said axial bore to close said port means when said piston is actuated.

5. The master cylinder according to claim 4 wherein said piston seal means comprises a cup-type seal.

6. The master cylinder according to claim 2, 3, 4, or 5, wherein said actuating means includes a push rod operatively connected to move said piston toward said outlet passage and spring means positioned between said housing and said push rod for biasing said push rod away from said piston.

7. An interchangeable cartridge assembly for a number of types of master cylinders, each type of master cylinder including a housing having a corresponding longitudinal bore, an oil inlet in said housing for admitting fluid to said bore and a tab in said bore, said assembly comprising a cylinder adapted to be removably mounted in said longitudinal bore, said cylinder including an axial bore and a fluid outlet passage at one end of said axial bore for communicating with a brake assembly, a slot in said cylinder in a position to engage said tab to align said cylinder in said bore, means on said one end of said cylinder for mounting said cylinder on a fixed stop, port means in said cylinder for connecting said longitudinal bore to said axial bore, and a piston mounted for reciprocal motion in said axial bore to discharge fluid from said axial bore to said brake assembly.

8. The cartridge according to claim 7 wherein said cylinder includes a pair of O-ring seals positioned to engage said longitudinal bore on each side of said oil inlet to form an annular oil passage around said cylinder, said port means comprising a timing port and a compensating port in said cylinder located between said seals for connecting said oil passage to said axial bore and said piston including a first annular seal positioned to engage said axial bore between said ports and a second annular seal spaced from said first annular seal to define an oil reservoir for said compensating port whereby said first annular seal will close said timing port on movement of said piston toward said fluid outlet passage.

* * * * *